United States Patent [19]

Huster et al.

[11] Patent Number: 5,715,666
[45] Date of Patent: Feb. 10, 1998

[54] REFLEX LOCATING DEVICE

[75] Inventors: Jochen Huster, Harsewinkel; Norbert Diekhans, Guetersloh; Helmut Homburg, Harsewinkel, all of Germany

[73] Assignee: Claas Kommanditgesellschaft auf Aktien, Harsewinkel, Germany

[21] Appl. No.: 613,045

[22] Filed: Mar. 8, 1996

[30] Foreign Application Priority Data

Mar. 13, 1995 [DE] Germany ............... 195 08 942.1

[51] Int. Cl.⁶ .................... A01D 41/12; B62D 5/00
[52] U.S. Cl. .................... 56/10.2 F; 56/10.2 R
[58] Field of Search ............... 56/10.2 F, 10.2 R, 56/DIG. 15, 10.8, 16.4–16.6, 10.2 A; 364/424.07; 460/1; 172/2, 4, 4.5, 7

[56] References Cited

U.S. PATENT DOCUMENTS

| | | | |
|---|---|---|---|
| 3,797,208 | 3/1974 | Strubbe | 56/10.2 F |
| 3,952,828 | 4/1976 | Stampfer et al. | 56/10.2 F |
| 4,918,441 | 4/1990 | Bohman | 56/DIG. 15 X |
| 5,019,983 | 5/1991 | Schutten et al. | 56/10.2 F X |
| 5,488,817 | 2/1996 | Paquet et al. | 56/10.2 R |

FOREIGN PATENT DOCUMENTS

| | | |
|---|---|---|
| 2109744 | 3/1971 | Germany . |
| 2455836 | 11/1974 | Germany . |

*Primary Examiner*—Terry Lee Melius
*Assistant Examiner*—Robert Pezzuto
*Attorney, Agent, or Firm*—Michael J. Striker

[57] ABSTRACT

A reflex locating device on an agricultural machine or the like, in particular a harvested material edge locating device, has a transmitter and a receiver with a locating beam region oriented on the agricultural machine so that it is slightly inclined toward the ground and, when the grain edge side position is correct, detects a part of the standing grain in front of the harvesting mechanism and detects with a remaining part the stubble field. The locating device for this purpose is arranged at a distance above the grain, and the locating beam region is oriented substantially perpendicular to the harvesting mechanism and detects inclinedly from above partially the grain field and partially the stubble field.

26 Claims, 3 Drawing Sheets

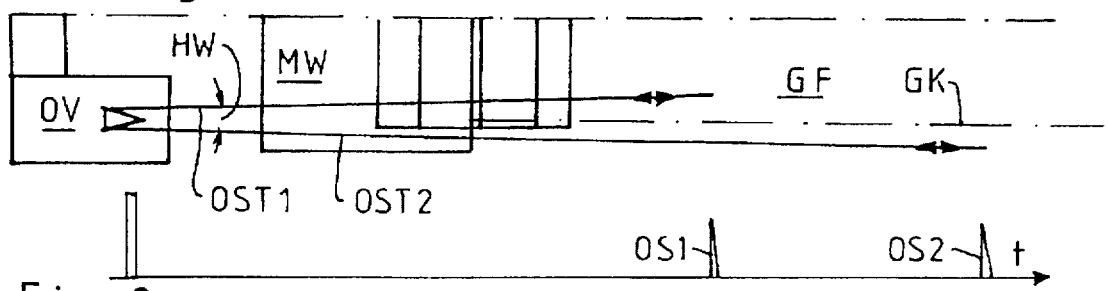
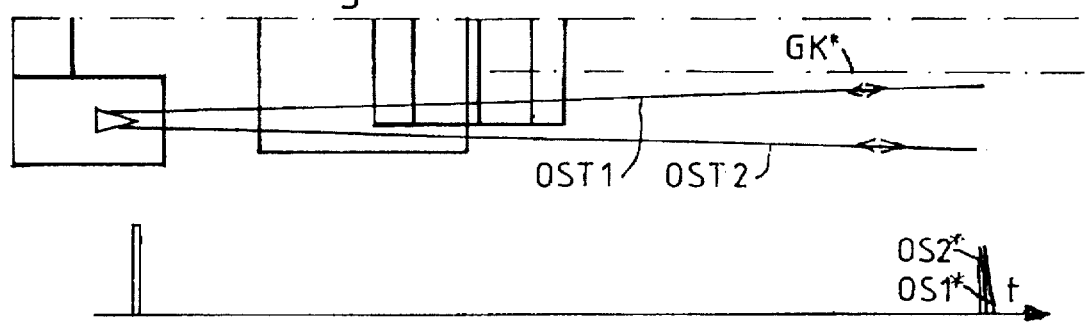
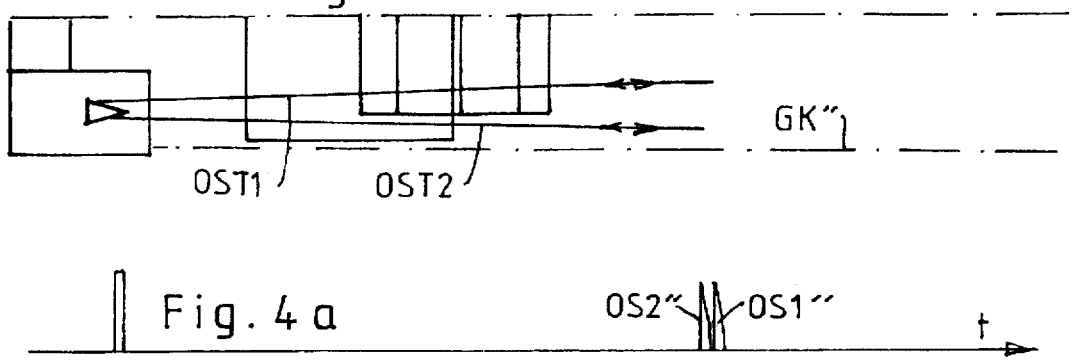
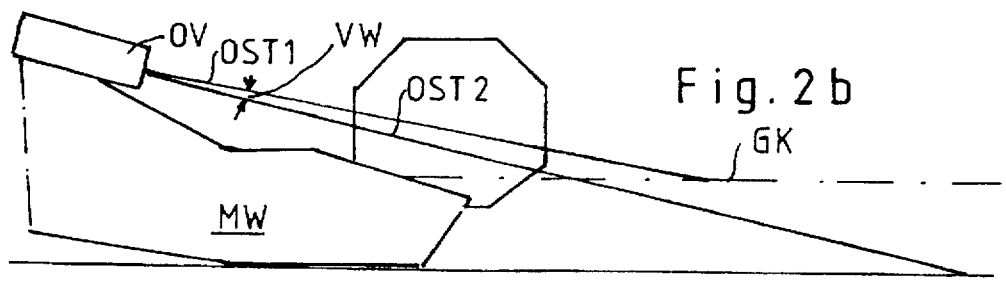

REFLEX LOCATING DEVICE

BACKGROUND OF THE INVENTION

The present invention relates generally to a reflex locating device on an agricultural machine and the like in particular a locating device for harvested material edges.

More particularly it relates to such a reflex locating device whose locating signals are supplied to a regulating device providing at least one steering hydraulic adjusting signal to an electrically controlled steering hydraulic system of steerable wheels of the agricultural machine so that a corresponding locating signal deviation from a predetermined location criteria, in particular a predetermined side distance of a material edge from a lateral, cutter edge is minimized. A transmitter and a receiver of the locating device are oriented with their location beam region on the agricultural machine so that it is slightly inclined to the ground and detects the material field.

Such an arrangement is known from the German document DE-C-24 55 836 which has a transmitter and a receiver slightly inclined toward the ground from the harvesting mechanism and forming an acute angle with the standing grain, and the receiver signal amplitude is evaluated in comparison with a predetermined nominal value for a steering regulation. For reducing disturbances, small-band light emitters, polarizers and modulators or short-wave strongly bundled electromagnetic waves and a periodical horizontal deviation of the meter as well as corresponding signal evaluating means are utilized. When the lateral sensing of the grain front is produced there is a disadvantage that fluctuating properties, in particular an alternating density of the standing grain or lying grain considerably influence the steering and thereby the vehicle is steered in a weak or lying condition.

Another locating device is disclosed in the German document DE-A-21 09 744. It includes an emitter arranged near the cutters on the harvesting mechanism and near the material edges in the grain field, photocells arranged at both sides of the emitter and produce sensor signals which actuate associated control relays whose inverse operating contacts cooperate with the right and left controlling steering hydraulic valves of the rear wheels of the agricultural machine. This device has the disadvantage that the density of the harvested material is directly introduced into the regulating accuracy since depending on the density a fine side offset of the harvesting mechanism relative to the harvested material edge is signalled. Moreover, a deviation of the traveling direction from the course of the harvested material edges is not recognized, that influences the regulating conditions.

SUMMARY OF THE INVENTION

Accordingly, it is an object of the present invention to provide a reflex locating device which provides a detection of the harvested material edges independent from the grain density and allows an accurate steering regulations.

In keeping with these objects and with others which will become apparent hereinafter, one feature of the present invention resides, briefly stated, in a locating device which is arranged above the grain at a distance from it and the locating beam region is oriented substantially perpendicular to the harvesting mechanism, and when the side position of the grain edges is correct detects in front of the harvesting mechanism with one partial beam region inclinedly from above the standing grain of the grain field and with the remaining partial beam region detects the stubble field.

It is advantageous to provide a harvester thresher either with two partial locating devices so that one device detects the stubble field and the other device detects the grain field, or to detect by partial regions of one locating beam at both sides of the grain edge the grain and the stubble. In the first case sharply bundled optical sensor signals, in particular laser beam reflexes (reflections) can be evaluated, while in the second case acoustic echo signals or microwave reflexes can be evaluated.

The locating device which senses the grain edges at both sides is preferably oriented so that it covers a region located several meters in front of the harvesting mechanism of the harvester since it is steered on its rear wheels and therefore a deviation from a predetermined travel way can be compensated after a great covered travel way.

In this arrangement it is advantageous to introduce the actual signal of the wheel adjustment angle as further input values so that practically starting from this signal the subsequent way of the harvester can be considered. For this purpose it is advantageous to provide a two-dimensional characteristic field whose input values in digitalized form are the normalized locating signal and the wheel adjusting angle signal and whose contents form a corresponding steering control value. This characteristic field can be further optimized repeatedly for an optimal steering and easily adapted to special conditions.

It has been shown that in conventional harvester threshers substantially 60% of the attention of a driver is directed to the steering of the machine. The steering is especially tiring since the steering with the rear wheels requires relatively long lead time until a lateral position change of the harvester thresher relative to the grain edge occurs, and then by corresponding reverse control again the straight travel must be performed. The automatic steering therefore provides practically complete unloading of the driver with a fast travel and an approximately complete unloading of the harvesting mechanism width until a safety remaining distance of 10–20 cm.

The part locating devices are preferably laser distance meters. However, also ultrasonic transmitter-receiver devices can be used as well.

The location sensor which covers the regions at both sides of the grain edge has a focusing means with a spatial angle which has a half value width of 8° and a 90% detection width of 16°. It is advantageous when the part location sensors are arranged on the lateral edge of the harvesting mechanism at the height of substantially 1 m–1.5 m above the ground and 200 mm–400 mm above the spikes (ears). In the impinging region the spatial angle provides a detected region of substantially 1 m diameter.

Two different embodiments of the reflex locating devices include one device which operates with an ultrasonic or microwave fan which produces a partial echo from the grain subjected to the waves and a later partial echo reflected from the stubble field. These both echo components independently from their arrival are associated with both located regions and detected separated in time. The relative values of the both regions relative to one another or the echo signal from the grain are utilized relative to or in relation to a comparison value as a control criterium. This comparison value as well as the time limits for the signal evaluation are preliminarily stored in the regulating device or in the central processor, so that they can be preselected depending on the fruit type and the grain height.

Preferably each signal in the first and second time region is integrated, so that the fluctuations which are caused by the non-uniformities of the surfaces are substantially eliminated from the signal. It is advantageous to impart to the location beam a semi-value width of 5°–10° so as to obtain a good regulating quality. Somewhat occurring side lobe of the location beam and the receiver sensitivity distribution have no substantial action, since the center of the location beam practically lies over the harvested material edge and substantially coincides with the same when a correct orientation of the harvesting mechanism relative to the grain stock is obtained.

It has been recognized to be advantageous when the locating device is arranged substantially 100 mm–500 mm, preferably 200 mm–400 mm over the spikes and its inclination angle relative to the horizontal amounts to 5° to 45°, preferably 15° to 25°. The holding device is therefore formed so that an adjustment of the location device as to its height and/or inclination angle can be performed in correspondence with the respective grain. Also, a motor-driven adjustment of the height and/or the inclination can be provided. It has been recognized to be advantageous when the inclination adjustment and/or the height adjustment correspondingly during entry into a predetermined harvested material type and normal orientation of the harvesting mechanism relative to the harvested material edge are regulated so that the first, earlier echo signal and the second, later locating signal occur correspondingly at predetermined times after the locating pulse emission.

In accordance with a further embodiment, two relatively sharply bundled part locating beams, in particular laser beams diverge by several degrees, inclined at an acute angle to horizontals, and are oriented on the one hand toward the stubble field and on the other hand toward the grain field. Echoes (reflections) occur hereby at different times after the emission of a laser pulse. If the reflections are located very early and close near one another, a steering correction is needed to bring a beam from the grain field, and when both echoes are located later a steering correction is needed so that a beam again falls on the grain field. Thereby a two-point regulation is provided. For obtaining a high regulating quality it is recommended to provide both beams with a divergence of approximately 3° and to incline them at least 15° relative to the horizontal, so that they touch the grain field and the ground in 3 m–6 m and in 6 m–12 m distance.

It has been recognized as advantageous when both beams in the verticals are inclined slightly relative to one another, whereby both echoes obtain a small distance in time and they are both reflected from the ground or both reflected from the grain field. In this manner it can be also recognized whether both beams have reached their target or are reflected substantially in the reel or in other words before the operative region of interest. The vertical divergence of the beams is preferable between 1° and 5°.

In this embodiment both part locating devices are arranged vertically movably or turnably relative to one another. Also, only one part device can be adjustable. The normal adjustment is preferably selected so and regulated preferably automatically at the beginning of the work on a field so that both echo signals occur simultaneously at a predetermined average echo time when the correct orientation of the harvesting mechanism is provided. In the event of a deviation of the harvesting mechanism direction or a side offset of the harvesting mechanism from the normal position, one echo signal occurs too late or too early, that can be used in the operation for the steering correction.

In accordance with another embodiment, instead of two laser part beams with fixed horizontally divergent adjustments, one laser beam which is fan-like and swinging is utilized, or in other words a so-called scanner. The corresponding horizontal angular position of the locating beam is continuously signalled the regulating device, and that angular value with which the passage of the locating beam through the harvested material edge is recognized for the evaluation of the signal is utilized with respect to the average position angular value and the total scanner angular value as the normalized locating signal during the regulation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a grain edge sensor with two location beams in a normal operation;

FIG. 2a is a view showing reflex signals of the grain edge sensor of FIG. 2;

FIG. 2b is a side view of the grain edge sensor of FIG. 2;

FIG. 3 is a view showing a grain edge sensor during a deviation in a stubble field;

FIG. 3a is a view showing echo signals associated with the grain edge sensor of FIG. 3;

FIG. 4 is a view showing a grain edge sensor with two location beams in a grain field;

FIG. 4a is a view showing echo signals associated with the grain edge sensor of FIG. 4;

DESCRIPTION OF THE PREFERRED EMBODIMENTS

Figure 1:
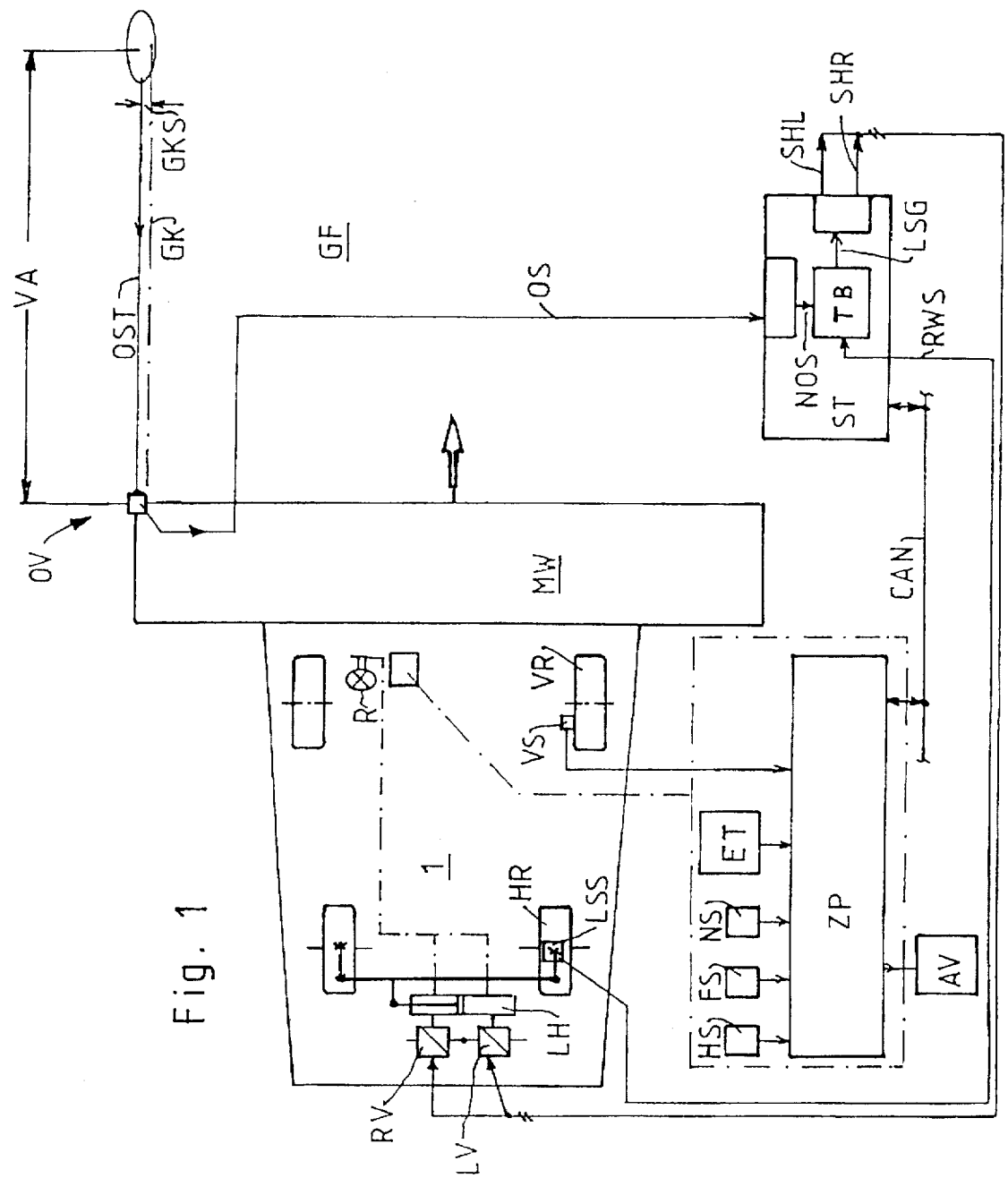
FIG. 1 is a schematic view of a harvester thresher with the steering regulating device.

FIG. 1 shows a harvester thresher 1 provided with a harvesting mechanism MW. The harvesting mechanism MW must move along and be automatically regulated relative to a grain edge GK of a grain field GF with maintaining a smallest deviation from a predetermined grain edge side position GKS. A locating device OV is arranged approximately 1 m–1.5 m above the harvesting mechanism MW. Its locating beam region OST is oriented toward the stubble field and partially toward the grain field GF, or in other words at both sides of the grain edge GK. Its locating signals OS1 are supplied to a regulating device ST. The locating signals are preferable digitalized and converted into a normalized locating signal NOS.

In the shown example the regulating device ST is connected through a normalized data bus CAN with a central processor ZP which also monitors the remaining control processes of the harvester thresher. For this purpose and input keyboard ET and an output device AV are provided in the central processor ZP. Furthermore, the central processor ZP receives a speed signal VS from the front wheels VR. The steering hydraulic system LH is controlled by the regulating device ST by means of a left control valve LV and a right control valve RV. Their hydraulic outlets actuate the available steering hydraulic system LH which steers the rear wheels HR. A wheel adjustment angular signal RWS is received by the steering device and supplied to the regulating device ST. The steering adjustment valves LV, RV are spring-loaded and self-locking, so that they are closed in the event of current failure. In this condition the steering is taken over by the known hydraulic control of the steering wheel R. A hand switch HS, a foot switch FS and a safety switch NS are arranged in an operator's cabin. Their signals are supplied to the steering adjustment valve device for safety reasons, and the regulating device ST becomes accessible for its activation when these signals are available.

It has been recognized that the forward distance VA with which the location beam region OST senses the grain edge GK substantially corresponds to the distance between the front wheels VR and rear wheels HR. In this way, an angular deviation of the harvester thresher axis from the grain edge is provided, which is represented in the locating signal as partial components, an equivalent to the wheel adjustment angle signal. These corresponding angular components of the locating signal region overlap corresponding with the components of the side deviation of the direction axis of the harvester thresher from the predetermined nominal way, or in other words the components which correspondingly bring the side position of the grain edges GKS.

The locating device OV supplies its normalized locating signal NOS analogously or preferable digitalized to the regulating device ST. The other sensors which produce the remaining input values are distributed in the harvester thresher and send their signals, through associated digitalizers or computers, also to the regulating device. It is to be understood that their normalizers can be installed so that they are directly associated with the sensors.

A steering wheel adjustment sensor LSS is located on the steered rear wheels HR and its wheel angle signal RWS is used in a suitable way as an input signal.

It has been recognized as favorable to supply the normalized locating signals NOS and the wheel adjustment angle signals RWS in addressed way to a two-dimensional table TB which has a two dimensional characteristic field containing corresponding steering adjustment values LSG. The steering adjustment values LSG are converted correspondingly into a left and right hydraulic adjustment signal SHL, SHR and supplied to the left or right adjustments valves LV, RV.

When the regulating device is formed as a digital computer, the complete integration of the steering system into the remaining digital control system of the harvester thresher is possible. With a simple parametrization an operation from the central operational console of the harvester, the parameters can be given to the processor. The regulating device itself is completely neutral in its basic structure. Also, the different locating systems can be connected by simple parametrization and normalization of the signals and no special hardware design of the regulating device is needed.

FIG. 2 shows a locating device OV with two locating beams OST1, OST2 which diverge by an angle HW of substantially 5°. The locating beams OST1, OST2 impinge over the harvesting mechanism MW on the one hand onto the grain field GF and on the other hand near the harvested material edge GK on the stubble field. Therefore, a time echo signals OS1, OS2 is produced as shown in FIG. 2 at an earlier time point and at a later time point. Both locating signals OS1, OS2 are separated by a time filtering and show by their availability that a correct orientation of the harvesting mechanism MW relative to the grain edge GK is provided in predetermined limits.

FIG. 3 shows a displacement of the grain edge GK* away from the harvesting mechanism edge. Correspondingly, both beams OST1, OST2 impinge on the stubble field and late in time locating signals OS1., OS2, are produced as shown in FIG. 3. From the side view of FIG. 2b it can be recognized that the locating beams OST1* OST2* are emitted from the locating device OV so that they are offset by a vertical angle VW. Thereby the locating signals OS1, OS2, occur late in time but slightly offset relative to one another.

FIG. 4 shows a further case in which the grain edge GK2" is offset relative to the nominal position so that both locating beams OST1, OST2 impinge on the grain field. Thereby and because of the vertical offset VW of the beams, two echo signals OS1", OS2" are produced at an earlier time point slightly offset relative to one another as shown in FIG. 4a.

Figure 5:
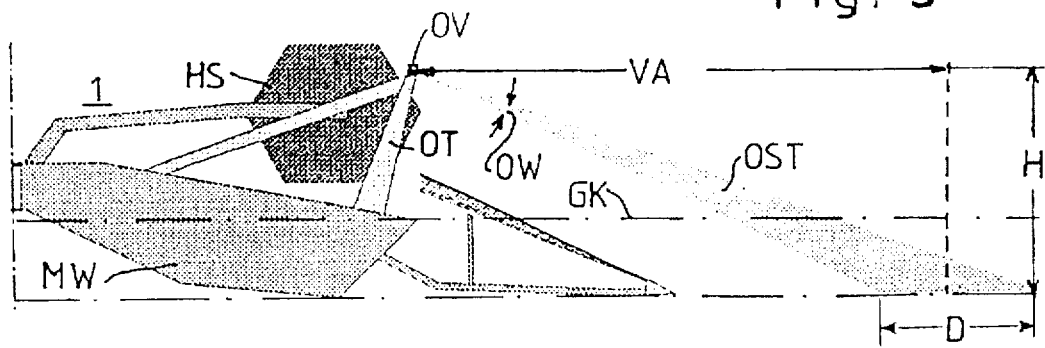
FIG. 5 is a side view of a second embodiment of the locating device with a sonic or microwave beam.

FIG. 5 shows a second embodiment of a side view of the harvesting mechanism MW of the harvester thresher 1 in the region of the grain edge GK and the locating beam region OST. The associated locating device OV is arranged on a support OT at a height H of substantially 1 m–1.5 m over the ground in the front region of the harvesting mechanism MW. The most favorable height is 200 mm–400 mm above the spikes. The locating beam region OST is partially inclined relative to the horizontal by 15°–25° to the ground and partially oriented toward the grain edge GK so that it includes a forward region VA of approximately 4 m–6 m of the ground. The spatial angle OW of the locating beam region which is covered amounts to substantially 8° for 50% of the signal part and substantially 16° for 90% of the signal part. The region covered on the ground has a diameter D of approximately 2 m.

Figure 5A:
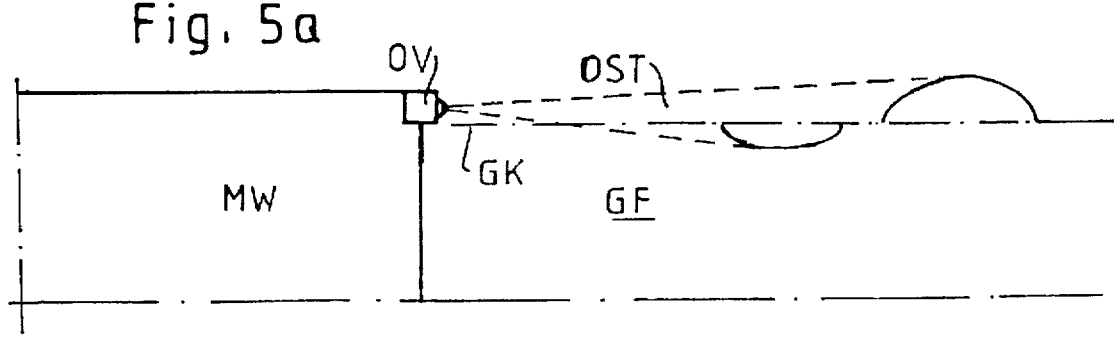
FIG. 5a is a front view of the locating device of FIG. 5.
Figure 5B:
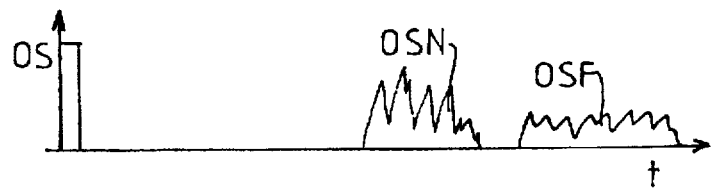
FIG. 5b is a view showing echo signals in the case of a correct orientation of the locating beam.

From the view of FIG. 5a it can be seen that the beam lobe or the beam fan impinges on the grain in an adjoining region to the harvesting mechanism in the case of the correct position of the harvesting mechanism relative to the grain edge, and in the remote region to another part on the stubble field. Correspondingly, two echo signals OSN, OSF are produced with substantially identical, average amplitude in the region which is close in time and spaced in time, as shown in FIG. 5.

Figure 6:
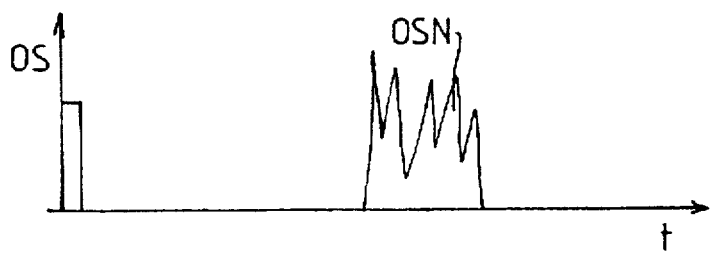
FIG. 6 is a view showing echo signals in the event of a locating beam oriented toward stubble field.
Figure 7:
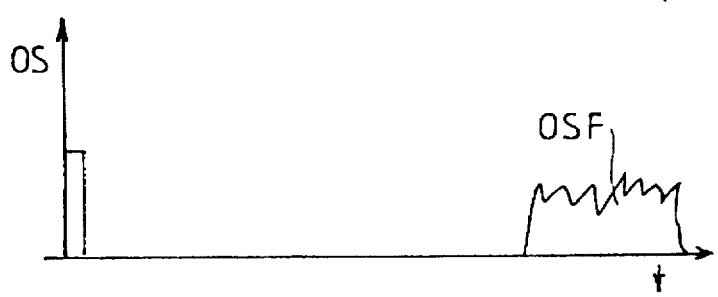
FIG. 7 is a view showing echo signals in the event of the locating beam oriented toward the grain field.

FIGS. 6 and 7 correspondingly show the echo signals OSN* OSF* in both positions of the harvesting mechanism which deviate from the normal position, which has a substantially double amplitude and correspondingly are either early in time or late in time. They echo on the grain is for example strongly structured when the stalks have different height or are bent. It is therefore recommended to integrate the early and the late echo signals in time and therefore to bring for evaluation the area of the signal. The signals are either set in their relation with one another and the quotient is compared with a comparison value such as for example one, and the result normalized in this manner is used for regulation.

It is also possible to use only one of the echo signals OSN, OSF which is earlier or later signal, by a comparison with a predetermined value corresponding to substantially half the full value in the case of the locating beam OST completely oriented to the grain stock or to the stubble field. With the correct orientation of the harvesting mechanism to the stock, the normalized locating signal NOS can for example have the zero value.

It will be understood that each of the elements described above, or two or more together, may also find a useful application in other types of constructions differing from the types described above.

While the invention has been illustrated and described as embodied in a reflex locating device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A combination of an agricultural machine with a reflex locating device, the combination comprising an agricultural machine including a harvesting mechanism, steerable wheels, an electrically controlled steering hydraulic system for steering said steerable wheels, and a regulating device actuating said electrically controlled steering hydraulic system; and a reflex locating device including a transmitter and a receiver operating with a locating beam region and arranged on said agricultural machine so that the locating beam region is somewhat inclined to the ground and detects a grain field, said locating device being arranged on said agricultural machine so as to be located above grain and said locating beam region being oriented substantially perpendicular to said harvesting mechanism and is operative so that when a side position of a grain edge is correct said locating device detects forwardly of said harvesting mechanism inclinedly from above a standing grain of a field with one partial beam region and also detects a stubble field with a remaining partial beam region, said locating device producing locating signals and supplying the locating signals to said regulating device such that a corresponding locating signal deviation from a predetermined locating criteria in form of a predetermined side distance of a harvested material edge from a lateral harvesting mechanism edge is minimized.

2. A combination as defined in claim 1, wherein said locating device is formed so that the locating beam region is composed of at least two narrowly bundled partial locating beams which are oriented relative to one another so that when the grain edge side position is correct, a first one of the partial locating beams is directed toward the grain field and a second one of the partial locating beams is directed toward the stubble field, and a position in time and a distance in time of both associated locating signals which are echo signals are evaluated so that a steering in the grain field is performed when both echo locating signals occur together in time or closely adjacent and relatively late, and a steering from the grain field is performed when both echo locating signals occur together in time or closely adjacent relatively late, and a straight steering is performed when a relatively earlier and a relatively later echo locating signal occur.

3. A combination as defined in claim 2, wherein said locating device is formed so that the two narrowly bundled partial locating beams are laterally spaced from one another.

4. A combination as defined in claim 2, wherein said locating device is formed so that the two narrowly bundled partial locating beams are divergent relative to one another.

5. A combination as defined in claim 2, wherein said locating device is formed so that both partial locating beams are differently inclined relative to a horizontal body a vertical angle of 1° to 5°, and when both echo locating signals occur not separately produce a disturbance message.

6. A combination as defined in claim 2, wherein said locating device includes two partial locating devices, said partial locating devices being formed so that both partial locating beams are inclined in verticals relative to one another so and said partial locating devices are arranged as to their relative height so that when said harvesting mechanism is oriented normally and when the grain edge side distance is normal, both locating signals occur at predetermined echo times in a same predetermined echo time, and an occurrence of an earlier and a later locating signal during the harvesting operation is supplied to said regulating device as a regulating criterium.

7. A combination as defined in claim 6; and further comprising adjusting means for preadjusting of a relative height of said partial locating devices.

8. A combination as defined in claim 6; and further comprising means for adjusting a relative inclination of said partial locating devices.

9. A combination as defined in claim 2, wherein said locating device is formed so that said partial locating beams are inclined downwardly by at least 15% and so as to touch the grain field at a distance of 3–6 m and to touch the stubble field at a distance of 6–12 m.

10. A combination as defined in claim 2, wherein said locating device is formed so that the partial locating beams diverge horizontally by substantially 3°.

11. A combination as defined in claim 2, wherein said locating device is formed so that the partial locating beams are laser beams.

12. A combination as defined in claim 2, wherein said locating device includes a laser scanner which periodically emits the partial locating beams and receives reflection locating signals for evaluation, and a control device recording a scanner angular position as a locating signal to determine a scanner angular position value and to supply it normalized to said regulating device, so that the reflex locating signals indicate a passage through the harvested material edge by a time position change.

13. A combination as defined in claim 1, wherein said locating device includes a transmitter and a receiver provided with focusing means so that the locating beam region detects a spatial angle with a half value width of 5°–10°, and in the case of a correct orientation of said harvesting mechanism and one halved locating beam partial region falls on relatively close spikes of the grain field while another halved locating beam partial region falls on the remove stubble field.

14. A combination as defined in claim 13, wherein said locating device being formed so that it is arranged 100 mm–500 mm above the spikes and inclined relative to a horizontal so as to be oriented toward the harvested material edge.

15. A combination as defined in claim 14, wherein said locating device is height adjustable.

16. A combination as defined in claim 14, wherein said locating device is inclined relative to the horizontal by 15°–25°.

17. A combination as defined in claim 1, wherein said locating device is arranged so that the locating beam region covers a forward distance in front of the harvested material edge so that a locating signal deviation from a comparison value provided as a locating criterium partially represents a harvested material edge side offset and partially represents a traveling direction angle relative to the harvested material edge.

18. A combination as defined in claim 17, wherein said steerable wheels are rear steerable wheels, said agricultural machine further including front wheels, said locating device being formed so that the forward distance substantially corresponds to a distance from said steerable rear wheels to said front wheels of said agricultural machine, said regulating device receiving a wheel adjustment angle signal from said rear wheels as a further actual signal.

19. A combination as defined in claim 18, wherein said locating device is formed so that a normalized locating signal and the wheel adjustment angle signal are supplied digitalized and addressed to a two-dimensional characteristic field which supplies a steering control value sot hat said steering hydraulic system produces a right steering and a left steering signal.

20. A combination as defined in claim 1, wherein said locating system is formed so that an earlier part of the locating signal is detected which is caused by the grain field, further processed and compared with a comparison value which corresponds to a half maximum value which occurs in the case of the locating beam region completely oriented in the grain field, and a deviation from the comparison value is further evaluated as a normalized locating signal in said regulating device.

21. A combination as defined in claim 1, wherein said locating system is formed so that an earlier part of the locating signal is detected which is caused by the grain field, amplitude evaluated and compared with a comparison value which corresponds to a half maximum value which occurs in the case of the locating beam region completely oriented in the grain field, and a deviation from the comparison value is further evaluated as a normalized locating signal in said regulating device.

22. A combination as defined in claim 20, wherein said locating device is formed so that the processing includes an amplitude evaluation.

23. A combination as defined in claim 1, wherein said locating device is formed so that an earlier part of the locating signal is detected which is caused by the grain field and separately a later part of the locating signal is detected which is caused by the stubble field, and the signal parts are integrated and then a quotient is formed which is normalized relative to a predetermined comparison value and is further evaluated as a normalized locating signal in said regulating device.

24. An agricultural machine with a reflex locating device as defined in claim 20, wherein said locating device is formed so that the comparison value as well as time limits of both parts of the locating signal for different harvested material types and different height and inclination adjustments are stored and selectable.

25. An agricultural machine with a reflex locating device as defined in claim 1, wherein said transmitter is an ultrasonic transmitter.

26. An agricultural machine with a reflex locating device as defined in claim 1, wherein said transmitter is a microwave transmitter.

* * * * *